(12) United States Patent
Hartmann et al.

(10) Patent No.: US 11,686,403 B2
(45) Date of Patent: Jun. 27, 2023

(54) VALVE HAVING A VALVE BODY

(71) Applicant: Buerkert Werke GmbH & Co. KG, Ingelfingen (DE)

(72) Inventors: Christian Hartmann, Ingelfingen (DE); Daniel Schmidt, Ingelfingen (DE); Holger Schwab, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 17/502,768

(22) Filed: Oct. 15, 2021

(65) Prior Publication Data

US 2022/0120356 A1 Apr. 21, 2022

(30) Foreign Application Priority Data

Oct. 19, 2020 (DE) ..................... 10 2020 127 493.9

(51) Int. Cl.
*F16K 27/02* (2006.01)
*F16K 11/044* (2006.01)

(52) U.S. Cl.
CPC ........ *F16K 27/0263* (2013.01); *F16K 11/044* (2013.01); *Y10T 137/86598* (2015.04); *Y10T 137/87885* (2015.04)

(58) Field of Classification Search
CPC ................. F15B 13/0438; F16K 11/04; Y10T 137/87885; Y10T 137/86598; Y10T 137/2322

See application file for complete search history.

(56) References Cited

U.S. PATENT DOCUMENTS

| | | | | |
|---|---|---|---|---|
| 1,797,591 A * | 3/1931 | Sartakoff | ................ | F16K 11/22 137/557 |
| 3,221,760 A * | 12/1965 | Buchanan | ........... | F15B 13/0438 251/335.1 |
| 4,168,724 A * | 9/1979 | Graffunder | .......... | B01J 19/0046 137/884 |
| 4,535,810 A * | 8/1985 | Duder | ....................... | F15C 3/14 137/596.17 |
| 4,848,391 A * | 7/1989 | Miller | ................... | F24D 3/1066 137/884 |
| 5,320,139 A * | 6/1994 | Paul | ........................ | G01N 1/31 137/565.33 |
| 5,593,134 A * | 1/1997 | Steber | .................. | F02M 59/466 251/129.08 |

(Continued)

FOREIGN PATENT DOCUMENTS

DE 69718016 T2 10/2003
NO 2007133297 A2 11/2007

*Primary Examiner* — Robert K Arundale
(74) *Attorney, Agent, or Firm* — Dilworth IP, LLC (57) ABSTRACT

A valve having a valve body to which an actuator can be fastened is specified, the valve body including at least a first and a second housing part made of plastic, a first fluid duct being formed in the first housing part and a second fluid duct being formed in the second housing part, and at least one of the two fluid ducts opening out at a valve seat, and at least one elongated, rectilinear stiffening element being inserted in sections both into the first housing part and into the second housing part, and the at least one stiffening element being at least approximately perpendicular to a plane in which the at least one valve seat extends.

17 Claims, 4 Drawing Sheets

(56) References Cited

U.S. PATENT DOCUMENTS

| | | | | |
|---|---|---|---|---|
| 5,950,674 A | * | 9/1999 | Wylie | G01N 30/20 137/606 |
| 2007/0215222 A1 | * | 9/2007 | Rauch | F15B 13/0438 137/625.62 |
| 2022/0120356 A1 | * | 4/2022 | Hartmann | F16K 11/044 |

* cited by examiner

Fig. 1

Prior art

VALVE HAVING A VALVE BODY

FIELD OF THE INVENTION

The invention relates to a valve having a valve body which is reinforced by at least one stiffening element.

BACKGROUND

Valve bodies usually consist of several plastic housing parts. A valve body formed of two or more interconnected plastic housing parts tends to deform at high fluid pressure, as a result of which the valve may start to leak at the interfaces between the housing parts or with other valve components. The occurrence of such leaks can be avoided by using complex seals or by screwing the housing parts together. However, the disadvantage thereof is that assembly is complicated and that the use of special seals is cost-intensive.

It is therefore an object of the present invention to provide a valve having a valve body which is particularly easy to assemble and inexpensive to manufacture.

SUMMARY

The invention provides a valve having a valve body to which an actuator can be fastened, the valve body comprising at least a first and a second housing part made of plastic, a first fluid duct being formed in the first housing part and a second fluid duct being formed in the second housing part, and at least one of the two fluid ducts opening out at a valve seat, and at least one elongated, rectilinear stiffening element being inserted in sections both into the first housing part and into the second housing part, and the at least one stiffening element being at least approximately perpendicular to a plane in which the at least one valve seat extends.

Approximately perpendicular means that the at least one stiffening element encloses an angle of at most 10 degrees with a normal to the plane in which the at least one valve seat extends. In particular, the stiffening element is exactly perpendicular to a plane in which the at least one valve seat extends.

The at least one stiffening element provides additional stiffening of the housing parts, in particular in a fluid-carrying area of the valve body, and stabilization of the housing parts relative to each other, so that deformation or displacement of the housing parts is prevented. This prevents gaps from forming along the fluid ducts or between the housing parts, which could cause the valve to leak. A bulging of the valve body as a whole is also prevented, so that when the valve is installed on a mounting plate, there is no gap between the valve body and the mounting plate.

In particular, in a 3/2-way valve, two valve seats are aligned parallel to each other, the same closing element being assigned to both valve seats.

The sealing of the individual housing parts relative to each other as well as the sealing of the valve body relative to a mounting plate can thus be carried out particularly easily by using O-rings.

Furthermore, the at least one stiffening element ensures a precise alignment of the housing parts to each other.

In particular, the stiffening element counteracts forces acting perpendicularly to the stiffening element.

In that the stiffening element is at least approximately perpendicular to the plane in which the valve seat extends, the at least one valve seat is prevented from being displaced or tilted in the plane. On the one hand, this prevents leaks at the valve seat and, on the other hand, ensures that the at least one valve seat can optimally cooperate with a closing element.

The assembly time is reduced due to the fact that the at least one stiffening element is inserted into the housing parts and not screwed thereto.

The at least one stiffening element is preferably rigid, a particularly good stiffening being thus achieved.

In the preferred embodiment, the stiffening elements are made of metal.

For example, the at least one stiffening element has a continuously constant cross-section. The at least one stiffening element is in particular a cylindrical pin.

Due to the stiffening, the valve is also suitable for particularly high pressures, in particular for pressures up to 20 bar.

According to one embodiment, the stiffening element extends over an entire width of the valve.

Preferably, both housing parts have fastening means for the positionally fixed locking thereof relative to each other, which are spaced apart from the stiffening element. The fastening means are, for example, screw holes via which the housing parts can be screwed directly to each other and/or to a common mounting plate.

The at least one stiffening element extends, for example, in a plane which is perpendicular to a vertical axis of the valve at the level of the fluid ducts. A particularly good stiffening in the fluid-carrying area of the valve body is thus achieved.

Preferably, the fluid ducts extend in sections parallel to the at least one stiffening element.

Alternatively or additionally, at least one stiffening element extends in a plane which runs above the fluid ducts perpendicularly to a vertical axis of the valve, in particular along or above a resting face of the valve body against which an actuator of the valve rests. In this way, the valve body is particularly well stabilized in an area adjacent to the actuator.

According to one embodiment, a further housing part in which a fluid chamber is formed is provided for the valve body, the further housing part being arranged between the first and the second housing part such that the first and the second fluid duct are connected to each other via the fluid chamber. The fluid chamber provides sufficient space to accommodate a closing element by means of which a fluid flow through the valve body can be adjusted.

The at least one stiffening element preferably extends through the further housing part. Thus, the occurrence of leaks at the interfaces between all housing parts is avoided.

Starting from the fluid chamber, a further fluid duct can extend through further housing parts, the fluid duct in particular opening out at a bottom of the valve body.

The fluid ducts in the first and in the second housing part preferably also open out at the bottom of the valve body.

The openings of the fluid ducts at the bottom of the valve assembly are preferably surrounded by sealing rings, in particular by O-rings. When the valve body is mounted on a mounting plate, the sealing rings are clamped between the valve body and the mounting plate and thus ensure a reliable sealing of the fluid ducts.

For example, the housing parts are inserted from opposite sides into the further housing part with fluid duct tube sections, in particular wherein the end faces of the fluid duct tube sections form valve seats which end in the fluid chamber. The fluid duct tube sections thus contribute to an alignment of the housing parts with each other. In addition, sealing rings for sealing the housing parts to each other can be positioned particularly well on the tube sections.

The further housing part and the two housing parts are preferably inserted into each other in a form-fitting manner and aligned with each other by means of plug connections integrally formed with one or both housing parts. The plug connections additionally increase the rigidity of the valve body. In addition, the plug connections contribute to a precise alignment of the first and the second housing part on the further housing part. This particularly simplifies the assembly of the valve body.

Both the first fluid duct and the second fluid duct preferably each open out at a valve seat. The valve seats may be opposite each other, in particular wherein the fluid ducts open into the fluid chamber. A fluid flow through the valve body may thus be adjusted due to an interaction of a closing body and the valve seats.

A sealing ring, in particular an O-ring, which surrounds the respective valve seat is preferably provided between the first housing part and the further housing part and/or between the second housing part and the further housing part. As no or only slight relative movements occur between the housing parts due to the stiffening element, sufficient sealing of the housing parts to each other is achieved by the sealing rings.

According to one embodiment, the valve has an actuator which comprises a valve drive and an actuator housing and which rests against a resting face of the valve body, wherein the at least one stiffening element extends in sections into the actuator housing. This has the advantage that there is an additional connection between the valve body and the actuator, as a result of which leakage between the valve body and the actuator is reliably avoided. The valve can thus be designed particularly well as a media-separated valve. In particular, the fluid chamber of the valve body can be sealed particularly easily relative to the actuator.

The actuator housing has, for example, two housing parts, the stiffening element extending into each of the housing parts.

At least one recess is preferably provided in each of the housing parts into which the stiffening element extends, the at least one stiffening element being received in the recess at least in sections in a form-fitting manner and/or with a frictional fit. Thus, a defined positioning of the stiffening element is ensured so that the housing parts can be aligned particularly precisely with each other by means of the stiffening element. An accommodation of the at least one stiffening element with a frictional fit in the recesses also ensures that the housing parts are already held together before a positionally fixed locking takes place.

The recess is, for example, a blind hole or a through hole.

The recess may be formed in a rib which extends in particular along the resting face of the valve body. By means of the rib, components or assemblies may also be fastened to each other which do not overlap in the plane in which the stiffening element extends. This means that the stiffening element can be positioned in a particularly flexible manner by means of the rib.

Preferably, a movably mounted closing element is provided, which in a first position blocks a fluid flow through the first fluid duct and releases a fluid flow through the second fluid duct and in a second position blocks a fluid flow through the second fluid duct and releases a fluid flow through the first fluid duct. The valve may thus be designed as a 3/2-way valve.

In particular, the closing element is reciprocally movable, preferably pivotable, between two opposite valve seats. Thus, both valve seats can be closed equally by the one closing element.

DETAILED DESCRIPTION

Figure 1:
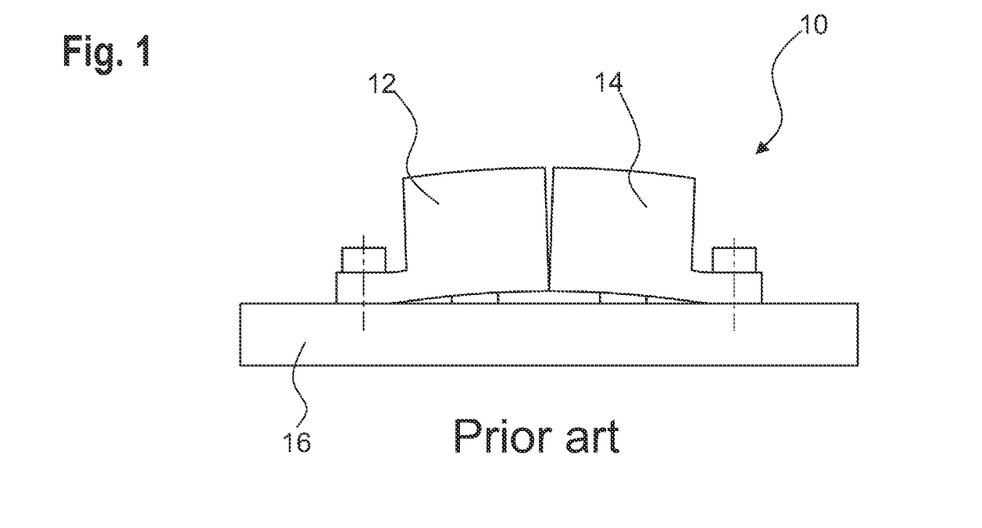
FIG. 1 schematically shows an exemplary valve body.

FIG. 1 schematically shows an exemplary valve body 10 for a valve.

The valve body 10 comprises a first housing part 12 and a second housing part 14, wherein a fluid duct is formed in each housing part 12, 14. The fluid ducts are not visible in FIG. 1.

The valve body 10 is mounted on a mounting plate 16. The valve body 10 is in particular fluidically connected to the mounting plate 16.

If a fluid pressure is present in the valve body 10, the housing parts 12, 14 may deform as illustrated in FIG. 1, causing the valve body 10 to leak and the fluid guided in the fluid ducts to escape in an undesirable manner from the valve body 10.

Figure 2:
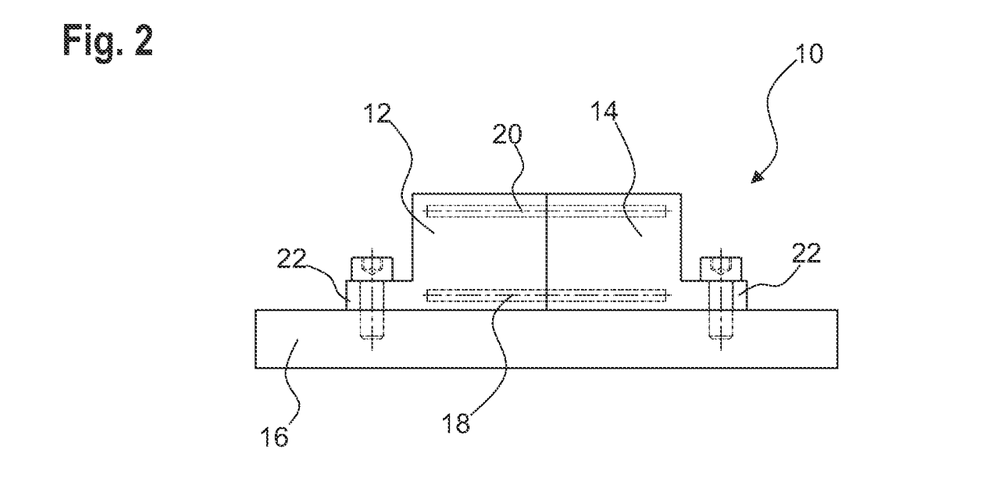
FIG. 2 schematically shows a valve body of a valve according to the invention.

FIG. 2 schematically shows a further valve body 10 which is improved in terms of its rigidity compared to the valve body 10 shown in FIG. 1.

The valve body 10 has in particular elongated, rectilinear stiffening elements 18, 20, which are designed as cylindrical pins and are made of metal.

The stiffening elements 18, 20 are inserted in sections both into the first housing part 12 and into the second housing part 14.

The stiffening elements 18, 20 provide stiffening and stabilization of the valve body 10 so that the valve body 10 does not deform in the presence of a fluid pressure. This prevents gaps from occurring between the individual housing parts 12, 14 and/or between the housing parts 12, 14 and the mounting plate 16.

The two housing parts 12, 14 each have a fastening means 22. The fastening means 22 serve to lock the first and the second housing part 12, 14 in a fixed position relative to each other.

In the illustrated example embodiment, the fastening means 22 are designed as screw lugs which are integrally formed with the housing parts 12, 14 such that the housing parts 12, 14 can be screwed to a mounting plate 16. In this way, the housing parts 12, 14 are indirectly locked relative to each other via the mounting plate 16.

Alternatively, the fastening device 22 can also be designed such that the housing parts 12, 14 can be screwed directly together for locking.

In both cases, the fastening means 22 are formed at a distance from the stiffening elements 18, 20.

Figure 3:
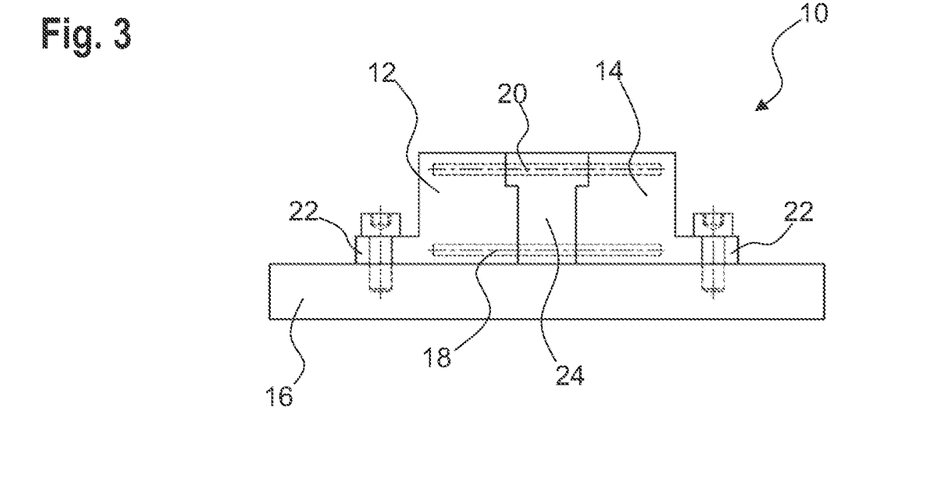
FIG. 3 schematically shows an alternative valve body of a valve according to the invention.

FIG. 3 schematically shows a further valve body 10 for a valve mounted on a mounting plate 16.

The valve body 10 illustrated in FIG. 3 differs from the valve body 10 illustrated in FIG. 2 in that a further housing part 24 is present, which is arranged between the first housing part 12 and the second housing part 14.

The housing parts 12, 14, 24 are made of plastic.

A valve 26 having a valve body 10 according to FIG. 3 is illustrated in detail in FIGS. 4 to 7 below. The valve 26 is a 3/2-way valve.

Figure 4:
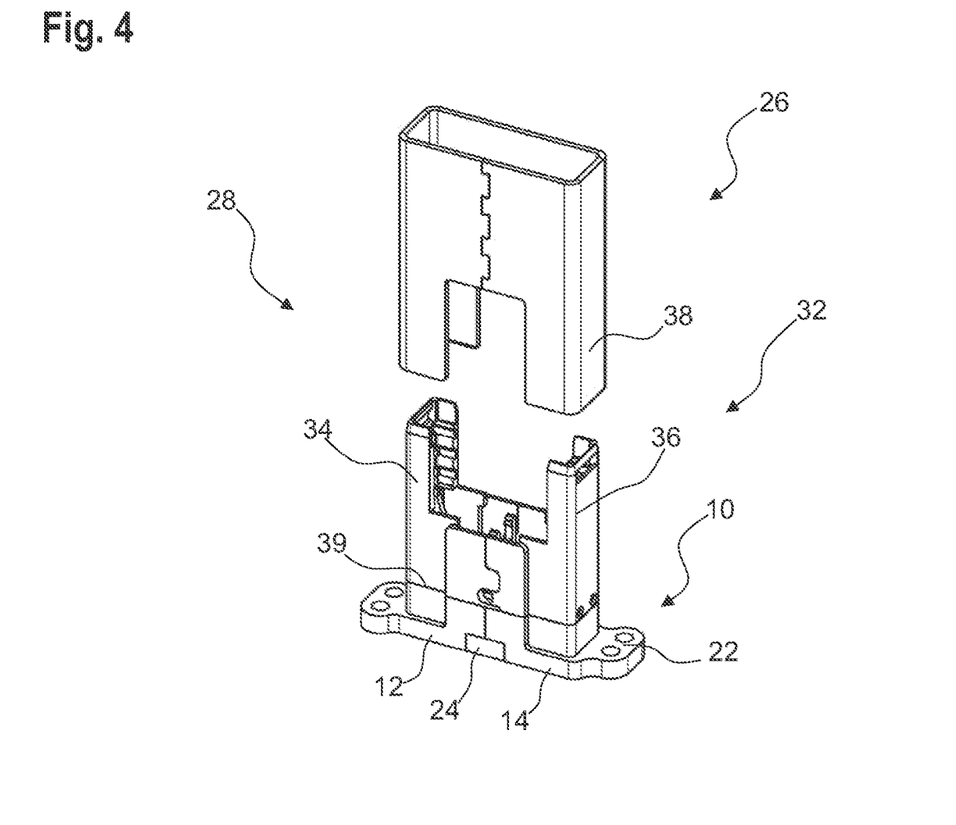
FIG. 4 shows parts of a valve according to the invention.

FIG. 4 shows parts of a valve 26 having a valve body 10 according to FIG. 3, in particular having three housing parts 12, 14, 24, and an actuator 28.

Figure 5:
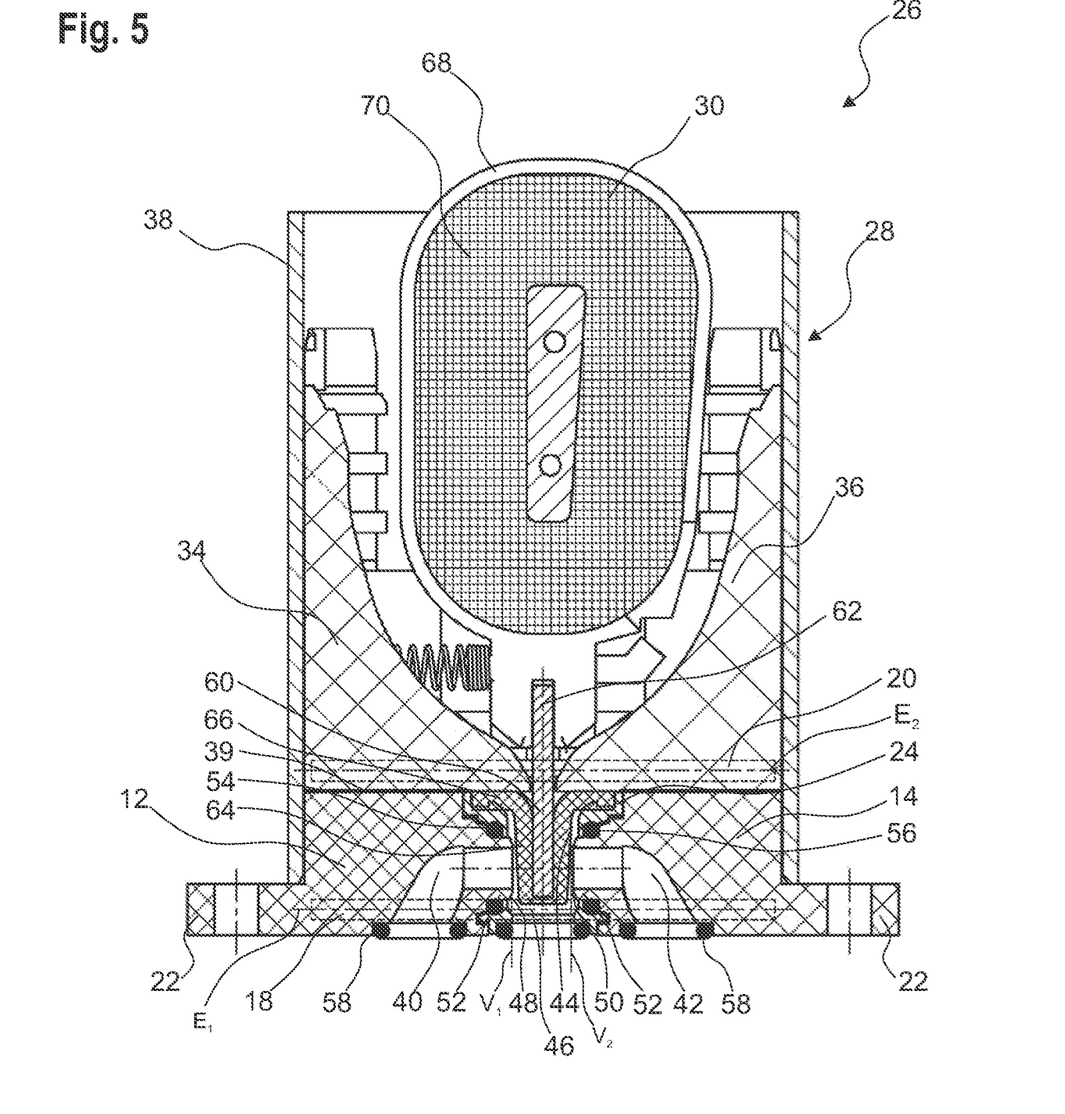
FIG. 5 shows a sectional view of a valve according to the invention.

The actuator 28 comprises a valve drive 30, which is shown in FIG. 5, and an actuator housing 32. The actuator housing 32 comprises a first actuator housing part 34, a second actuator housing part 36 and a housing sleeve 38, which is in particular in two parts.

The actuator housing parts 34, 36 are inserted into each other when viewed in the horizontal direction.

The housing sleeve 38 is slipped over the actuator housing parts 34, 36 and prevents the actuator housing parts 34, 36 from becoming detached from each other.

The housing sleeve 38 is preferably in two parts and consists in particular of a magnetically conductive steel.

The actuator 28 rests against a resting face 39 of the valve body 10.

In the illustrated example embodiment, the valve drive 30 is an electrodynamic drive, more precisely a Lorentz force drive.

In a Lorentz force drive, the Lorentz force is used as the driving force for an actuator. A coil arranged in a magnetic field and coupled to an actuating element can in particular be supplied with current to deflect the actuating element.

Alternatively, an electromagnetic, a piezoelectric, a motorized, a pneumatic, a hydraulic, a mechanical drive or a drive having an electroactive polymer may be used.

FIG. 5 shows a sectional view of the valve 26. In FIG. 5, it can be seen that a first fluid duct 40 is formed in the first housing part 12 and a second fluid duct 42 is formed in the second housing part 14.

A fluid chamber 44 which connects the first fluid duct 40 and the second fluid duct 42 to each other is formed in the third housing part 24, which is arranged between the first and the second housing part 12, 14.

A fluid duct 46 is also formed in the third housing part 24.

The first fluid duct 40 and the second fluid duct 42 open into the fluid chamber 44, the fluid ducts 40, 42 respectively opening out at a valve seat 48, 50.

The valve seats 48, 50 are annular.

The first housing part 12 and the second housing part 14 each have a fluid duct tube section 52, the end faces of the fluid duct tube sections 52 forming the valve seats 48, 50 which end in the fluid chamber 44.

The first housing part 12 and the second housing part 14 are inserted from opposite sides into the further housing part 24 with the fluid duct tube sections 52.

The first and the second fluid duct 40, 42 extend from the fluid chamber 44 in sections perpendicularly to a plane $V_1$, $V_2$ in which the respective valve seat 48, 50 associated with the fluid duct 40, 42 extends.

The stiffening elements 18, 20 also extend perpendicularly to the planes $V_1$, $V_2$ in which the valve seats 48, 50 extend.

In other words, the stiffening elements 18, 20 are aligned in the longitudinal direction with the course of the fluid ducts 40, 42 in the area of the valve seats 48, 50.

A sealing ring 54 which surrounds the valve seat 48 is arranged between the first housing part 12 and the third housing part 24. A further sealing ring 56 is arranged in the same manner between the second housing part 14 and the third housing part 24.

Starting from the fluid chamber 44, the fluid ducts 40, 42, 46 extend to an underside of the valve body 10.

At their end facing away from the fluid chamber 44, the fluid ducts 40, 42, 46 are also surrounded by sealing rings 58 to seal the fluid ducts 40, 42, 46 with respect to a mounting plate 16 not shown in FIG. 5.

The valve 26 further comprises a movably mounted closing element 60, which is arranged at least in sections in the fluid chamber 44.

The closing element 60 is reciprocally movable between the two opposite valve seats 48, 50.

More specifically, in a first position, the closing element 60 blocks a fluid flow through the first fluid duct 40 and releases a fluid flow through the second fluid duct 42. In a second position, the closing element 60 blocks a fluid flow through the second fluid duct 42 and releases a fluid flow through the first fluid duct 40.

FIG. 5 shows the closing element 60 in an intermediate position between the two valve seats 48, 50.

The closing element 60 comprises an actuating element 62 which is coupled to the valve drive 30. The actuating element 62 extends from the valve drive 30 into the fluid chamber 44.

The actuating element 62 is preferably made of metal.

In the fluid chamber 44, the actuating element 62 is surrounded by a diaphragm 64, which is made of an elastic material, for example. The diaphragm 64 ensures a reliable sealing of the valve seats 48, 50 when the closing element 60 is in the first position or in the second position.

A collar 66 is integrally formed with the diaphragm 64 and extends radially outwards from the actuating element 62. The collar 66 is preferably formed in an annular manner.

The collar 66 is arranged at an upper end of the fluid chamber 44 and is configured to seal the fluid chamber 44 from the actuator 28, such that the valve 26 is a media-separated valve.

The valve drive 30 has a coil carrier 68 and an energizable air coil 70.

The actuating element 62 is attached to the coil carrier 68.

As already explained in connection with FIGS. 2 and 3, stiffening elements 18, 20 are inserted into the valve body 10.

At least one stiffening element 18, in particular two stiffening elements 18, extend in a plane $E_1$ which is perpendicular to a vertical axis of the valve 26 at the level of the fluid ducts 40, 42. More precisely, the plane $E_1$ extends at a level below the valve seats 48, 50.

The stiffening elements 18 are in particular received in a form-fitting manner and with a frictional fit in the housing parts 12, 14, 24. By means of the stiffening elements 18, the housing parts 12, 14, 24 can be pre-assembled to each other, for example, so that handling of the valve body 10 during assembly is simplified.

The stiffening elements 18, which extend in the plane $E_1$, have the effect of avoiding a bulging of the valve body 10 on the underside thereof, so that a particularly good sealing of the valve body 10 with respect to a mounting plate 16 can be achieved.

At least one further stiffening element 20, in particular two stiffening elements 20, extend in a plane $E_2$ which runs above the fluid ducts 40, 42 perpendicularly to a vertical axis of the valve 26. In particular, the plane $E_2$ extends along or above the resting face 39 of the valve body against which the actuator 28 of the valve 26 rests. More precisely, the actuator housing parts 34, 36 rest against the resting face 39.

The stiffening elements 20 extend in sections into the actuator housing parts 34, 36. Furthermore, the stiffening elements 20 extend in sections in the first housing part 12 and in the second housing part 14. This can be seen particularly clearly in FIG. 7.

An additional connection between the actuator housing 32 and the valve body 10 is created by the stiffening elements 20 in the plane $E_2$. A positional alignment between the valve body 10 and the actuator housing 32 is thus achieved. In addition, the stiffening elements 20 stiffen the valve body 10 such that no bulging occurs in the region of the diaphragm 64, more precisely in the region of the collar 66, so that the fluid chamber 44 is particularly reliably sealed with respect to the actuator 28. The collar 66 of the diaphragm 64 is in particular prevented from deforming.

Furthermore, a particularly good seal in the area of the valve seats 48, 50 is achieved by the stiffening elements 18, 20, as no deformation of the valve body 10 occurs in this area either.

Figure 6:
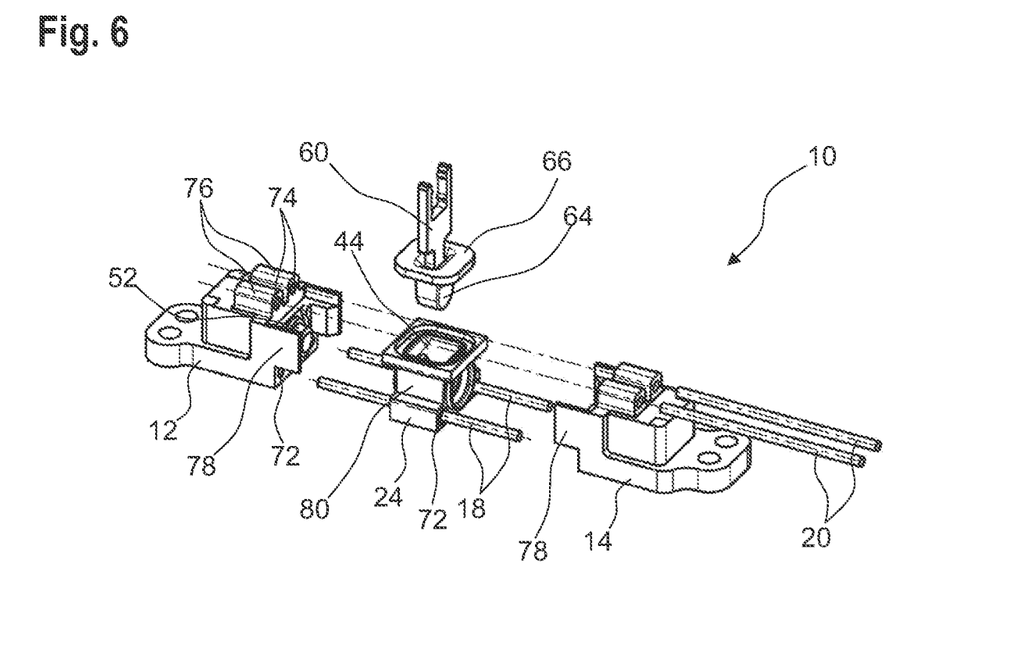
FIG. 6 shows parts of a valve body and a closing element of the valve of FIG. 5 in an exploded view.

FIG. 6 shows the parts of the valve body 10 together with the closing element 60 in an exploded view.

It can be seen in FIG. 6 that recesses 72 are provided in the housing parts 12, 14, 24. In the first and the second housing part 12, 14, the recesses 72 are formed as blind holes. In the third housing part 24, the recesses 72 are formed as through-holes.

The stiffening elements 18, which extend in the plane $E_1$, extend into the recesses 72 or, in the case of the third housing part 24, through the recesses 72 and are received therein at least in sections in a form-fitting manner and/or with a frictional fit.

Further recesses 74 are formed in ribs 76 which extend along the resting face 39 of the valve body 10.

The stiffening elements 20, which run in the plane $E_2$, extend at least in sections into the recesses 74 in the ribs 76, more precisely through the recesses 74.

Figure 7:
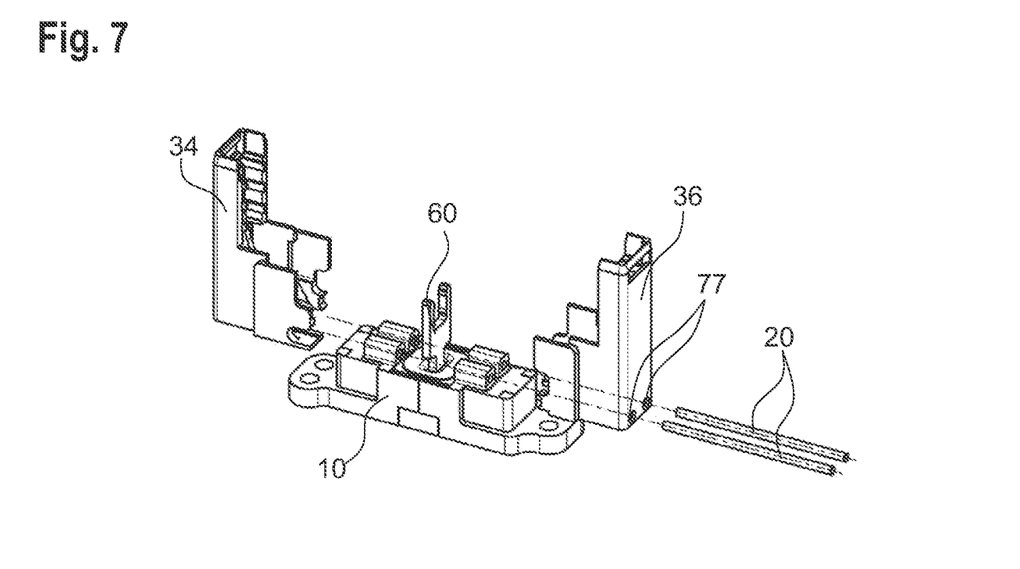
FIG. 7 shows a valve body and parts of an actuator of the valve of FIG. 5.

Recesses 77 into which the stiffening elements 20 also extend are additionally provided in the actuator housing parts 34, 36 (see FIG. 7).

The recesses 74 in the ribs 76 and the recesses 77 in the actuator housing parts 34, 36 are aligned with each other.

As can be seen in FIG. 6, plug connections 78 are integrally formed with the first housing part 12 and the second housing part 14. The plug connections 78 may be plugged in a form-fitting manner in an appropriate recess 80 in the third housing part 24 such that the third housing part 24 and the two housing parts 12, 14 are plugged in a form-fitting manner into each other and are aligned with each other.

In an alternative embodiment, which is not shown in the figures for simplicity, a valve seat 48, 50 may be formed on the first housing part 12 or on the second housing part 14, and the valve 26 may be formed as a 2/2-way valve.

The invention claimed is:

1. A valve having a valve body to which an actuator can be fastened, the valve body comprising at least a first and a second housing part made of plastic, a first fluid duct being formed in the first housing part and a second fluid duct being formed in the second housing part, and at least one of the first or the second fluid ducts opening out at a valve seat, and at least one elongated, rectilinear stiffening element being at least partially inserted both into the first housing part and into the second housing part, and the at least one elongated, rectilinear stiffening element being at least approximately perpendicular to a plane in which the valve seat extends, wherein a further housing part in which a fluid chamber is formed is provided for the valve body, the further housing part being arranged between the first and the second housing parts such that the first and the second fluid ducts are connected to each other via the fluid chamber, and wherein the first and the second housing parts are inserted from opposite sides into the further housing part with fluid duct tube sections.

2. The valve according to claim 1, wherein the first and the second housing parts have fasteners for positionally fixed locking thereof relative to each another, which are spaced apart from the at least one elongated, rectilinear stiffening element.

3. The valve according to claim 1, wherein the at least one elongated, rectilinear stiffening element extends in a plane which, at a level of the first and the second fluid ducts, is perpendicular to a vertical axis of the valve.

4. The valve according to claim 1, wherein the at least one elongated, rectilinear stiffening element extends in a plane which runs above the fluid ducts perpendicularly to a vertical axis of the valve.

5. The valve according to claim 4, wherein the at least one elongated, rectilinear stiffening element extends along or above a resting face of the valve body against which an actuator of the valve rests.

6. The valve according to claim 1, wherein the at least one elongated, rectilinear stiffening element extends through the further housing part.

7. The valve according to claim 1, wherein the first fluid duct opens out at the valve seat and the second fluid duct opens out at a second valve seat, wherein end faces of the fluid duct tube sections form the valve seat and the second valve seat which end in the fluid chamber.

8. The valve according to claim 1, wherein the further housing part and the first and the second housing parts are inserted into one another in a form-fitting manner and are aligned in position with respect to each another by integrally formed plug connections.

9. The valve according to claim 1, wherein both the first fluid duct opens out at the valve seat and the second fluid duct opens out at a second valve seat.

10. The valve according to claim 1, wherein the valve has an actuator which comprises a valve drive and an actuator housing and which rests against a resting face of the valve body, the at least one elongated, rectilinear stiffening element at least partially extending into the actuator housing.

11. The valve according to claim 1, wherein at least one recess is provided in each of the first and the second housing parts into which the at least one elongated, rectilinear stiffening element extends, the at least one elongated, rectilinear stiffening element being at least partially received in the recess in a form-fitting manner and/or with a frictional fit.

12. The valve according to claim 11, wherein the recess is formed in a rib.

13. The valve according to claim 12, wherein the rib extends along a resting face of the valve body.

14. The valve according to claim 1, wherein a movably mounted closing element is provided, which in a first position blocks a fluid flow through the first fluid duct and releases a fluid flow through the second fluid duct and in a second position blocks a fluid flow through the second fluid duct and releases a fluid flow through the first fluid duct.

15. The valve according to claim 14, wherein the first fluid duct opens out at the valve seat and the second fluid duct opens out at a second valve seat, wherein the closing element is reciprocally movable between the valve seats and the second valve seat.

16. A valve having a valve body to which an actuator can be fastened, the valve body comprising at least a first and a second housing part made of plastic, a first fluid duct being formed in the first housing part and a second fluid duct being formed in the second housing part, and at least one of the first or the second fluid ducts opening out at a valve seat, and at least one elongated, rectilinear stiffening element being at least partially inserted both into the first housing part and into the second housing part, and the at least one elongated, rectilinear stiffening element being at least approximately perpendicular to a plane in which the at least one valve seat extends, wherein at least one recess is provided in each of the first and the second housing parts into which the at least one elongated, rectilinear stiffening element extends, the at least one elongated, rectilinear stiffening element being at least partially received in the recess in a form-fitting manner and/or with a frictional fit, wherein the recess is formed in a rib.

17. A valve having a valve body to which an actuator can be fastened, the valve body comprising at least a first and a second housing part made of plastic, a first fluid duct being formed in the first housing part and a second fluid duct being formed in the second housing part, and at least one of the first or the second fluid ducts opening out at a valve seat, and at least one elongated, rectilinear stiffening element being at least partially inserted both into the first housing part and into the second housing part, and the at least one elongated, rectilinear stiffening element being at least approximately perpendicular to a plane in which the at least one valve seat extends, wherein at least one recess is provided in each of the first and the second housing parts into which the at least one elongated, rectilinear stiffening element extends, the at least one elongated, rectilinear stiffening element being received in the recess in a form-fitting manner and/or with a frictional fit, wherein the recess is formed in a rib.

\* \* \* \* \*